US010757077B2

(12) United States Patent
Rajahalme et al.

(10) Patent No.: US 10,757,077 B2
(45) Date of Patent: Aug. 25, 2020

(54) STATEFUL CONNECTION POLICY FILTERING

(71) Applicant: Nicira, Inc., Palo Alto, CA (US)

(72) Inventors: Jarno Rajahalme, Belmont, CA (US); Jonathan Stringer, Mountain View, CA (US); Soner Sevinc, San Francisco, CA (US); Ben Pfaff, Redwood, CA (US); Justin Pettit, Los Altos Hills, CA (US)

(73) Assignee: NICIRA, INC., Palo Alto, CA (US)

( * ) Notice: Subject to any disclaimer, the term of this patent is extended or adjusted under 35 U.S.C. 154(b) by 94 days.

(21) Appl. No.: 15/814,293

(22) Filed: Nov. 15, 2017

(65) Prior Publication Data

US 2019/0149516 A1 May 16, 2019

(51) Int. Cl.
*H04L 29/06* (2006.01)
*H04L 12/721* (2013.01)
*H04L 12/741* (2013.01)
*H04L 12/801* (2013.01)

(52) U.S. Cl.
CPC .......... *H04L 63/0254* (2013.01); *H04L 45/38* (2013.01); *H04L 45/74* (2013.01); *H04L 63/0263* (2013.01); *H04L 69/22* (2013.01); *H04L 47/10* (2013.01)

(58) Field of Classification Search
CPC . H04L 63/0254; H04L 63/0227; H04L 63/02; H04L 45/74; H04L 45/00; H04L 69/22; H04L 69/00; H04L 45/38; H04L 63/0263; H04L 47/10; H04L 47/00

USPC .......................................................... 370/392
See application file for complete search history.

(56) References Cited

U.S. PATENT DOCUMENTS

| | | | |
|---|---|---|---|
| 8,488,577 B1 | 7/2013 | Macpherson | |
| 8,874,789 B1 | 10/2014 | Zhu | |
| 10,375,155 B1* | 8/2019 | Cai | ...................... H04L 41/0896 |
| 2005/0089327 A1* | 4/2005 | Ovadia | ................... H04L 45/04 398/47 |
| 2005/0114648 A1 | 5/2005 | Akundi et al. | |
| 2006/0195896 A1 | 8/2006 | Fulp et al. | |
| 2008/0095153 A1 | 4/2008 | Fukunaga et al. | |
| 2009/0249472 A1 | 10/2009 | Litvin et al. | |
| 2009/0271586 A1 | 10/2009 | Shaath | |
| 2012/0213074 A1 | 8/2012 | Goldfarb et al. | |
| 2014/0003422 A1 | 1/2014 | Mogul et al. | |

(Continued)

*Primary Examiner* — Jeffrey M Rutkowski
*Assistant Examiner* — Luna Weissberger
(74) *Attorney, Agent, or Firm* — Adelli LLP

(57) ABSTRACT

A method for performing stateful processing of a packet at a flow-based managed forwarding element (MFE) is provided. The method sends a first packet from the MFE to a connection tracker that stores headers of a set of original direction packets that each established a new connection. The method receives, from the connection tracker, the first packet with the header of an original direction packet associated with the first packet appended to the first packet. The header of the original direction packet includes (i) a second set of IP addresses different than a first set of IP addresses of the first packet and (ii) stateful connection status information. The method replaces a first set of IP addresses of the first packet with the second set of IP addresses and performs a matching operation on the packet based on the second set of IP addresses and the stateful connection status information.

20 Claims, 8 Drawing Sheets

(56) References Cited

U.S. PATENT DOCUMENTS

| | | |
|---|---|---|
| 2014/0096183 A1 | 4/2014 | Jain et al. |
| 2014/0321459 A1 | 10/2014 | Kumar et al. |
| 2015/0016279 A1 | 1/2015 | Zhang et al. |
| 2015/0078384 A1* | 3/2015 | Jackson ................ H04L 45/748 370/392 |
| 2015/0103679 A1* | 4/2015 | Tessmer .............. H04L 43/0811 370/252 |
| 2015/0124608 A1* | 5/2015 | Agarwal ............... H04L 47/122 370/235 |
| 2015/0237013 A1* | 8/2015 | Bansal ................ H04L 63/0263 726/13 |
| 2015/0295831 A1* | 10/2015 | Kumar .................. H04L 47/125 370/235 |
| 2016/0105333 A1 | 4/2016 | Lenglet et al. |
| 2016/0164826 A1 | 6/2016 | Riedel et al. |
| 2016/0277294 A1 | 9/2016 | Akiyoshi |
| 2016/0373364 A1 | 12/2016 | Yokota |
| 2017/0019329 A1 | 1/2017 | Kozat et al. |
| 2017/0195255 A1 | 7/2017 | Pham et al. |
| 2017/0273099 A1 | 9/2017 | Zhang et al. |
| 2017/0339110 A1 | 11/2017 | Ni |
| 2018/0115471 A1 | 4/2018 | Curcio et al. |
| 2018/0184281 A1* | 6/2018 | Tamagawa ............ H04W 76/12 |
| 2018/0227216 A1* | 8/2018 | Hughes .................. H04L 45/12 |
| 2019/0089679 A1 | 3/2019 | Kahalon et al. |

* cited by examiner

STATEFUL CONNECTION POLICY FILTERING

BACKGROUND

Packet filtering rules that match on packet's header fields can be used to implement a firewall policy to determine which packets should be admitted and which should be dropped. For stateful firewall rules, a record has to be kept of at least the admitted packets in order to correlate the subsequent packets to determine whether the packets belong to a previously established connection. The record can then be used, for example, to admit reply direction packets for the connections where forward direction packets were admitted.

This "connection tracking" may be further enhanced by tracking related connections even when the Internet protocol (IP) addresses and/or port numbers of the related data connection may be different from the original control connection. For instance, the data connections related to file transfer protocol (FTP) control connections can be used with the premise that if the control connection was admitted, then the data connections should be admitted too. As a further refinement, the connection tracking state may be used to keep track of network address and/or port translation (NAT/NAPT), allowing reply direction packets to be properly correlated with the original connection and reverse transformation to be performed. This is essential in allowing the source of the connection to remain unaware of any packet header transformations.

There are several practical problems in implementing a stateful firewall with the connection tracking facility. First, packets such as reply packets are admitted on the basis of a valid connection tracking entry under a particular firewall policy. If the firewall policy changes, then the validity of each connection tracking entry must be assessed or "revalidated" under the new policy. Failure to do so may result in wrongfully admitting packets. Revalidation may be performed by iterating through all connection tracking entries after each such policy change and removing the connection tracking entries for the connections that have become stale.

This solution has a few problems, though. Such revalidation may take a lot of time and resources if there are thousands of connection tracking entries and if policy changes are frequent. Additionally, such a revalidation may require the presence of the full packet headers and metadata (e.g., tunneling headers) of the original packet to properly run the original packet through the packet processing pipeline and the firewall rules to determine if the connection would still be admitted. These concerns have been roadblocks for implementing this strategy in practice.

Second, if the existing connection state is not to be implicitly trusted for admitting return or related traffic, the firewall rules have to be duplicated for each packet direction to be able to match the reply direction packet headers against the firewall rules. This duplicates the resource use for the rules in both the control and data planes.

Also, in some cases the reply direction packets may have headers that are not simply reversed from the original direction packet, as is the case when an Internet control message protocol (ICMP) response is sent to a user datagram protocol (UDP) packet, or when an ICMP Echo response is sent for an ICMP echo request. This further complicates creation of the firewall filter rules by the control plane, and increases the resource use on the control and data planes in the form of additional packet filtering rules.

Third, as related connections may have practically arbitrary packet headers in relation to the original master connection, it is not possible to write firewall rules in terms of the actual packet headers that would admit or deny the related packets without basing this decision on the state of the connection tracking entry (e.g., related or established). This would make any firewall policy changes ineffective in changing the treatment of the related connection packets. For instance, an FTP data download may be allowed to continue even after a firewall policy change shutting down the FTP control connection.

BRIEF SUMMARY

Some embodiments provide a connection tracker that stores the packet headers of the first packet (referred to as the original direction packet) that establishes a new connection. The connection tracker makes the headers of the original direction packet of each connection available for matching in the data plane rules.

The connection tracker allows stateful firewall rules to be checked based on the headers of the original direction packet for all packets associated with a connection (in both directions) and the related connections (in both directions). The packets can be admitted or denied by matching the headers of the original direction packet against a single set of firewall rules without making any policy decision solely on the existence of the connection tracking entry.

The connection tracker in some embodiments is provided within the virtualization software in which a flow-based managed forwarding element (MFE) operates (e.g., in the kernel and/or user space), for use by the flow-based MFE. A flow-based MFE operates by matching incoming packets with one or more flow entries. Each flow entry includes a set of matching criteria (or condition) and a set of actions. The matching criteria specify a subset of the packet header values for which it requires a match. When a packet matches the set of matching criteria of a flow entry, the action or actions specified by the corresponding set of actions are performed on the packet.

Flow entries in a flow-based software MFE of some embodiments are stateless. The flow entry rules are written over only the stateless fields and metadata of the packet that are being processed. However, to implement a firewall, some firewall rules require knowledge of connection state. For instance, a firewall rule may require packets received from outside the host of the MFE on a new connection to be dropped while packets received from outside the host of the MFE on established connections to be allowed.

When a firewall rule requires the packet connection status, the matching criteria in the flow entry that defines the firewall rule refer to the packet connection status. As a result, the packet is sent to a connection tracker outside the forwarding element to determine the packet's connection status. The connection of each packet is identified by an n-tuple in the packet header in some embodiments. For instance, the n-tuple that identifies a transport layer connection may use the standard 5-tuple of the source IP address, the source (transport layer) port number, the destination IP address, the destination port number, and the identification of the transport layer protocol used by the packet. The connection tracker saves the n-tuple value of the first packet (i.e., the original direction packet) that establishes a new connection. The connection tracker makes the headers of the original direction packet of a connection available for matching in firewall rules for the packets that are sent or received on the connection as well as the packets that are sent or received on related connections.

Some protocols such as FTP use separate control and data connections between a pair of communication nodes such as client server pair. For these protocols, the original direction packet is the packet that establishes the control connection (also referred to as the master connection). The data connection, which is subsequently established, is referred to as the related connection and may have different source and destination IP addresses and/or different source and destination port numbers.

When the connection tracker receives a packet from the MFE, the connection tracker (i) adds the packet's n-tuple to a list of ongoing connections if the packet is the first packet that establishes a new connection (i.e. the packet is the original direction packet), (ii) tags the packet with a connection status (e.g., as belonging to a new connection, established connection, a connection related to another existing connection, a reply to an existing connection, etc.), (iii) adds the headers of the original direction packet of the connection to the current packet, and (iv) sends the packet back to the MFE with additional data (i.e., the headers of the original direction packet and one or more bits to identify the connection status).

The firewall rules in some embodiments are written based on the header fields of the original direction packet of each connection. The MFE utilizes flow entries that match over the header of the original direction packet of the connection. Since the original direction packet headers of the connection are typically examined and stored before any NAT/NAPT transformations, the firewall rules may be written without any complications related to transformations that may be present in the actual packet headers of actual packets of the master connection or of the related connections in either direction.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a connection tracker that stores the packet headers of the original direction packet (i.e., the first packet) that establishes a new connection. The connection tracker makes the headers of the original direction packet of each connection available for matching in the data plane rules.

Some protocols such as FTP use separate control and data connections between a pair of communication nodes such as client server pair. For these protocols, the original direction packet is the packet that establishes the master connection (i.e., the control connection). The corresponding data connection is referred to as the related connection, which may have different source and destination IP addresses and/or different source and destination port numbers.

The connection tracker allows stateful policy enforcement. For instance, firewall rules can be checked based on the headers of the original direction packet for all packets associated with a connection (in both directions) and the related connections (in both directions). The packets can be admitted or denied by matching the headers of the original direction packet against a single set of firewall rules without making any policy decision solely on the existence of the connection tracking entry. Although stateful policy enforcement is described by using several examples of enforcing firewall rules, it should be understood that the invention is applicable to enforcing any policy based on the state of a network connection.

I. Filtering Packets Based on the First Packet that Establishes a Connection

In some embodiments, the packet processing operations (e.g., classification operations, forwarding actions, etc.) are performed by a managed forwarding element (MFE) that operates as a software forwarding element. Open vSwitch (OVS) is an example of a flow entry-based software forwarding element. In some embodiments, the MFEs operate on host machines that host virtual machines (VMs) or other data compute nodes (DCNs) that serve as the sources and destinations for packets. For example, an MFE might operate on a host machine that hosts VMs or DCNs for several different logical networks, and would implement the several logical networks for each of the VMs or DCNs residing on the host. The MFE in some embodiments is configured and managed by a network controller.

Figure 1:
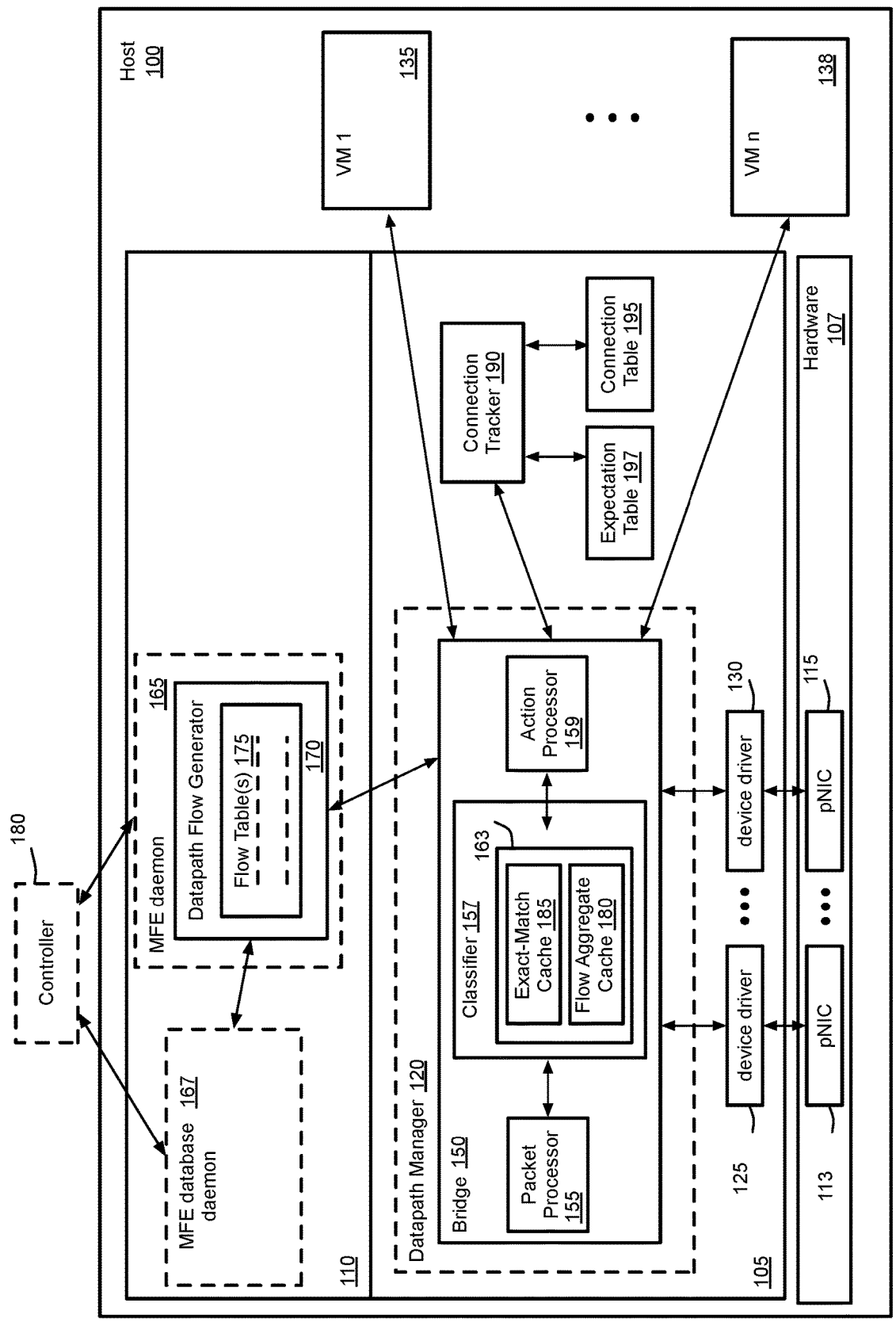
FIG. 1 conceptually illustrates an architectural diagram of a host machine on which a software-implemented MFE and a connection tracker of some embodiments are implemented.

FIG. 1 conceptually illustrates an architectural diagram of a host machine 100 on which a software-implemented MFE and a connection tracker of some embodiments are implemented. In some embodiments, the MFE is implemented in the virtualization software (e.g., in the hypervisor) of the host 100. In this example, the MFE includes several components, including a datapath manager 120, an MFE daemon 165, and MFE database daemon 167. In some embodiments, the datapath manager 120 operates in a kernel 105 of the virtualization software while the MFE daemon 165 and the MFE database daemon 167 both operate in the user space 110 of the virtualization software.

As shown in FIG. 1, the host 100 includes hardware 107 (although the figure shows a software architecture diagram, the hardware 107 is displayed in order to represent the physical network interface cards (pNICs) 113 and 115 of the host machine), virtualization software kernel 105, virtualization software user space 110, and several VMs 135-138. A VM is a software implementation of a machine such as a computer.

The MFE is a first-hop forwarding element for the VMs 135-138. The hardware 107 may include typical computer hardware (e.g., processing units), volatile memory (e.g., RAM), nonvolatile memory (e.g., hard disk, optical disks, solid-state memory, etc.), network adapters, etc. As shown, the hardware 107 also includes pNICs 113 and 115 for connecting a computing device to a network.

The virtualization software is a software abstraction layer that operates on top of the hardware 107 and below any operating system in some embodiments. In some embodiments, the kernel 105 performs virtualization functionalities (e.g., to virtualize the hardware 107 for several virtual machines operating on the host machine). The kernel 105 handles various management tasks, such as memory management, processor scheduling, or any other operations for controlling the execution of the VMs 135-138 operating on the host machine.

As illustrated in FIG. 1, the kernel 105 includes the datapath manager 120 and a connection tracker 190. The connection tracker has a connection table 190 and an expectation table 195, which are described below. The datapath manager processes and forwards network data (e.g., packets) between VMs running on the host 100 and network hosts external to the host (e.g., network data received through the pNICs 113 and 115). In some embodiments, the VMs 135-138 running on the host 100 couple to the datapath manager through a bridge 150.

In some embodiments, the bridge 150 manages a set of rules (e.g., flow entries) that specify operations for processing and forwarding packets. The bridge 150 communicates with the MFE daemon 165 in order to process and forward packets that the bridge 150 receives. In the example of FIG. 1, bridge 150 includes a packet processor 155, a classifier 157, and an action processor 159. The packet processor 155 receives a packet and parses the packet to strip header values. The packet processor 155 performs a number of different operations. For instance, in some embodiments, the packet processor 155 is a network stack that is associated with various network layers to differently process different types of data that it receives. Irrespective of all the different operations that it can perform, the packet processor 155 passes the header values to the classifier 157. In some embodiments, the packet processor stores these header values in one or more registers that are stored for a packet. In some embodiments, the packet processor 155 defines an object (e.g., a data structure) for the packet that includes the registers. The packet object is then used to represent the packet in the MFE.

The classifier 157 accesses one or more datapath caches 163 (also referred to as a flow cache) to find matching flow entries for different packets. For instance, in some embodiments, the classifier includes a flow aggregate cache 180 that contains flow entries, each of which is matched by packets falling into a particular traffic aggregate class. That is, each of the flow entries in the aggregate cache specifies a subset of the packet header values for which it requires a match, with the other packet header fields being wildcarded (i.e., a packet can match the flow entry while having any values for the wildcarded fields). In some embodiments, each of the flow entries in the datapath cache 163 specifies an action for the action processor 159 to perform on packets that match the flow entries. These datapath cache flow entries are installed by the classifier 157, in some embodiments, based on processing of a packet through the set of flow tables 175 by the MFE daemon 165. Although several examples are provided by reference to a flow cache, it should be understood that other types of storage (e.g., the storages described below by reference to FIG. 8 can be used to store the flows).

The classifier 157 also, or alternatively, includes an exact-match cache 185 in some embodiments. The exact-match cache of some embodiments includes entries that are matched by packets belonging to specific data flows (using, e.g., a flow key of packet headers extracted from the packet that uniquely identifies a connection). In some embodiments, an exact-match cache entry includes the match conditions (e.g., the flow key) and either an action or a reference to one of the flow entries in the traffic aggregate cache. As such, multiple different exact-match entries might refer to the same cached flow entry (e.g., for similar data flows for the packets of which the forwarding element will perform the same action).

When the classifier 157 receives the header values for a packet, it first performs a check with the exact-match cache to determine whether the packet belongs to a data flow that already has an entry in the cache. If a match is found in the exact-match cache, the classifier sends the packet to the action processor 159 with the action specified by the matched entry. When the packet does not belong to a data flow for which the exact-match cache already stores an entry, the classifier 157 performs a lookup on the aggregate flow cache to find a matching flow entry. When a matching flow entry is found in the aggregate flow cache, the classifier stores a new exact-match cache entry, which can be used for subsequent packets that belong to the same data flow.

In certain cases, no matching flow entries can be found in the datapath cache (e.g., for the first packet of a data flow that does not share enough characteristics with other data flows). In these cases, the MFE shifts control of the packet processing to the MFE Daemon 165 for a full set of packet processing operations (i.e., executing of numerous lookup stages over the flow tables 175, possibly including conjunctive match lookups). After completing the processing for a packet, the classifier 157 sends the packet to the action processor 159. The action processor 159 performs the set of actions specified for the packet.

The MFE daemon 165 of some embodiments includes a datapath flow generator 170. The datapath flow generator 170 is a component of the MFE that makes forwarding and other packet processing decisions. For any packet that is not matched in the datapath cache 163 (e.g., because the packet is the first in a new transport-layer connection), the datapath flow generator 170 performs the one or more flow table lookups required to process the packet, and then generates new flow entries to install in the cache 163. In some embodiments, the datapath flow generator includes or works in conjunction with a separate classifier (not shown) in order to find one or more matching flow entries in the flow tables 175. Unlike the classifier 157, the MFE daemon 165 may perform one or more resubmits (i.e., be resubmitted back to the classifier with packet data modified based on actions performed by previous matched flow entries).

Flow entries of the MFE in some embodiments are stateless. The flow entry rules are written over only the stateless fields and metadata of the packet that are being processed. However, to implement a firewall, some firewall rules require knowledge of connection state. For instance, a firewall rule may require packets received from outside the host of the MFE on a new connection to be dropped while packets received from outside the host of the MFE on established connections to be allowed.

When a firewall rule requires the packet connection status, the matching criteria in the flow entry that defines the firewall rule refer to the packet connection status. As a result, the datapath manager 120 sends the incoming packets to the connection tracker 190 when packet matches a flow entry that specifies an action that requires accessing the connection tracker.

A. Identifying a Packet's Connection

The connection of each packet is identified by an n-tuple in the packet header in some embodiments. For instance, the n-tuple that identifies a transport layer connection may use the standard 5-tuple of the source IP address, the source (transport layer) port number, the destination IP address, the destination port number, and the identification of the transport layer protocol used by the packet. The connection tracker 190 saves the n-tuple value of the first packet (i.e., the original direction packet) that establishes a new connection. The connection tracker makes the headers of the original direction packet of a connection available for matching in firewall rules for the packets that are sent or received on the connection as well as the packets that are sent or received on related connections.

Figure 2A:
FIGS. 2A-2C conceptually illustrates the establishment of a connection between two nodes and exchange of subsequent packets in some embodiments.
Figure 2B:
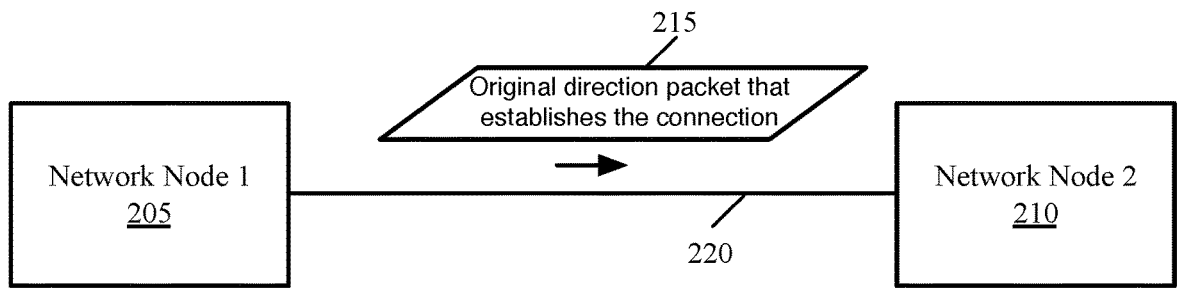
Figure 2C:
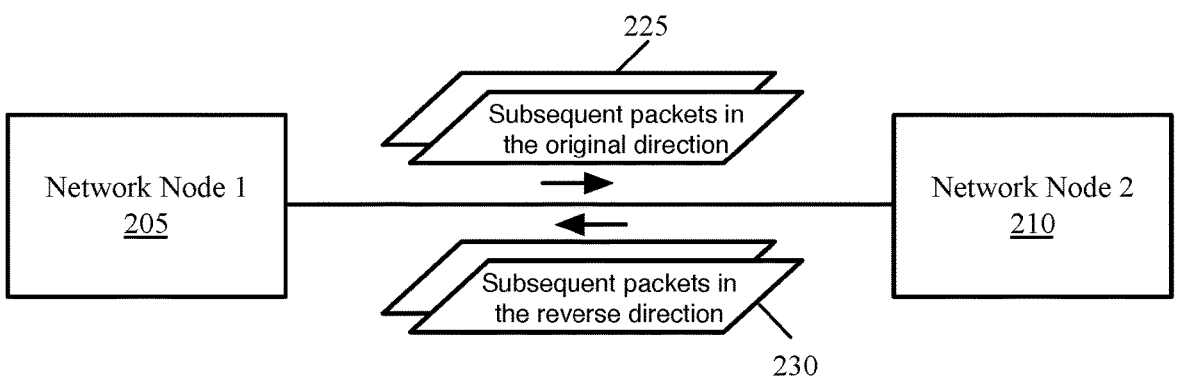

FIGS. 2A-2C conceptually illustrates the establishment of a connection between two nodes and exchange of subsequent packets in some embodiments. FIG. 2A shows the two network nodes 205-210 prior to the establishment of a connection. As an example, network node 1 205 may be a virtual machine 135-138 connected to the MFE bridge 150 and network node 2 210 may a virtual or physical machine outside the host 100 in FIG. 1.

In FIG. 2B, network node 1 205 establishes a connection 220 between the two nodes by sending a packet 215 to network node 2 210. The packet header includes an n-tuple that identifies the source IP address of the packet as the IP address of network node 1 205, the destination IP address of the packet as the IP address of network node 2 210, the source port of the packet as the transmission control protocol (TCP) port of network node 1 205, and the destination port of the packet as the TCP port of network node 2 210. The n-tuple also includes the identification of a protocol that network node 1 205 wants to use for communication.

The direction from network node 1 205 to network node 2 210 is referred to as the original direction of the connection and packet 215 is referred to as the original direction packet. Assuming that the firewall rules allow the establishment of a connection based on the above-mentioned n-tuple between the two nodes, the MFE sends a commit message to the connection tracker and the connection tracker sets the connection status as established. The connection tracker also stores the n-tuple of the original direction packet in the connection table 195.

FIG. 2C shows the subsequent exchange of packets 225 and 230 in the forward and reverse directions, respectively. The packets in the reverse directions are, e.g., the reply packets sent by network node 2 210 in response to receiving packets from network node 1 205. The connection tracker returns the n-tuple of the original direction packet in subsequent invocation of the connection tracker by the MFE whenever the n-tuple of a packet matches the n-tuple of packet 215 either in forward direction (i.e., when the n-tuples exactly match each other) or in the reverse direction (i.e., when the position of the source and destination IP addresses and port numbers are reversed).

Figure 3A:
FIGS. 3A-3C conceptually illustrates the establishment of a master control connection and a related data connection between two nodes in some embodiments.
Figure 3B:
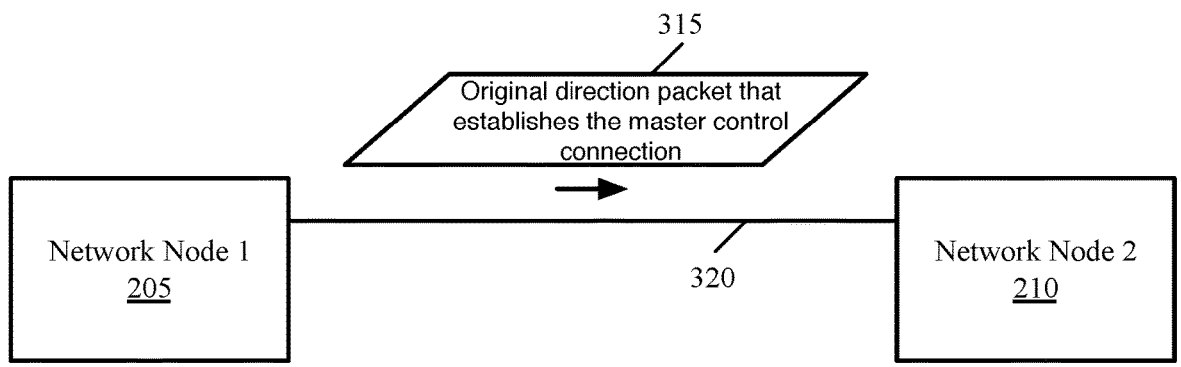
Figure 3C:
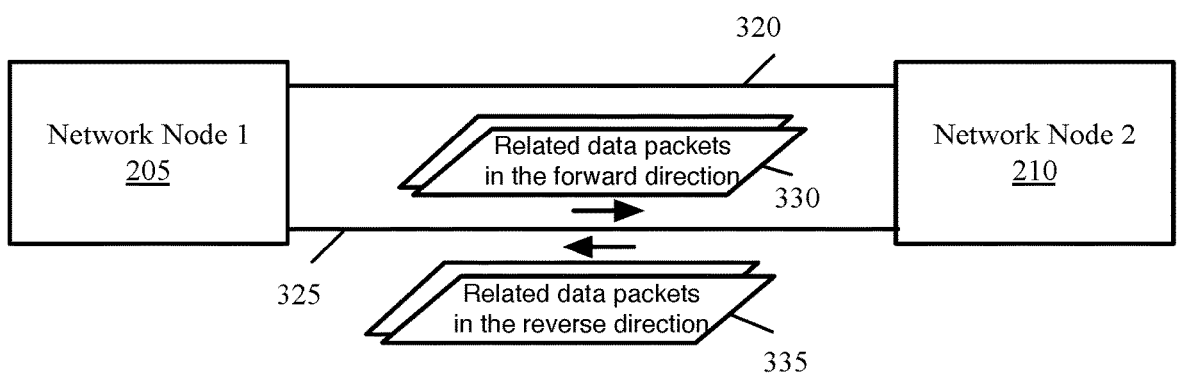

FIGS. 3A-3C conceptually illustrates the establishment of a master control connection and a related data connection between two nodes in some embodiments. FIG. 3A shows the two network nodes 205-210 prior to the establishment of a FTP connection. In FIG. 3B, network node 1 205 establishes an FTP control connection 320 between the two nodes by sending a packet 315 to network node 2 210. The packet header includes an n-tuple that identifies the source IP address of the packet as the IP address of network node 1 205, the destination IP address of the packet as the IP address of network node 2 210, the source port of the packet as the transmission control protocol (TCP) port of network node 1 205, and the destination port of the packet as the TCP port of network node 2 210. The n-tuple also includes the identification of the protocol (i.e., the FTP protocol) that network node 1 205 wants to use for communication.

The control connection 320 is referred to as the master connection. The direction from network node 1 205 to network node 2 210 is referred to as the original direction of the connection and packet 315 is referred to as the original direction packet. Assuming that the firewall rules allow the establishment of a connection based on the above-mentioned n-tuple between the two nodes, the MFE sends a commit message to the connection tracker and the connection tracker sets the connection status as established. The connection tracker also stores the n-tuple of the original direction packet in the connection table 195.

Since the two nodes are going to communicate using FTP, which requires separate control and data connections, the connection tracker also enters the source and destination IP addresses as well as the source and destination port numbers of the expected data connection in the expectation table 197 shown in FIG. 1. The information in this table is used to determine a subsequent data connection between the two nodes as a connection that is related to the master connection 320.

FIG. 3C shows the subsequent establishment of a data connection 325 and exchange of packets 3305 and 335 in the forward and reverse directions, respectively. The data connection is established after the two nodes exchange a set of packets. The connection tracker identifies the data connection 325 as a related connection of the master connection 320 based on the information stored in the expectation table 197. The connection tracker returns the n-tuple of the original direction packet in subsequent invocation of the connection tracker by the MFE whenever the n-tuple of a data packet in either in forward direction or in the reverse direction whenever the header fields of a packet matches the header information of packet 315 stored in the expectation table 197.

Figure 4:
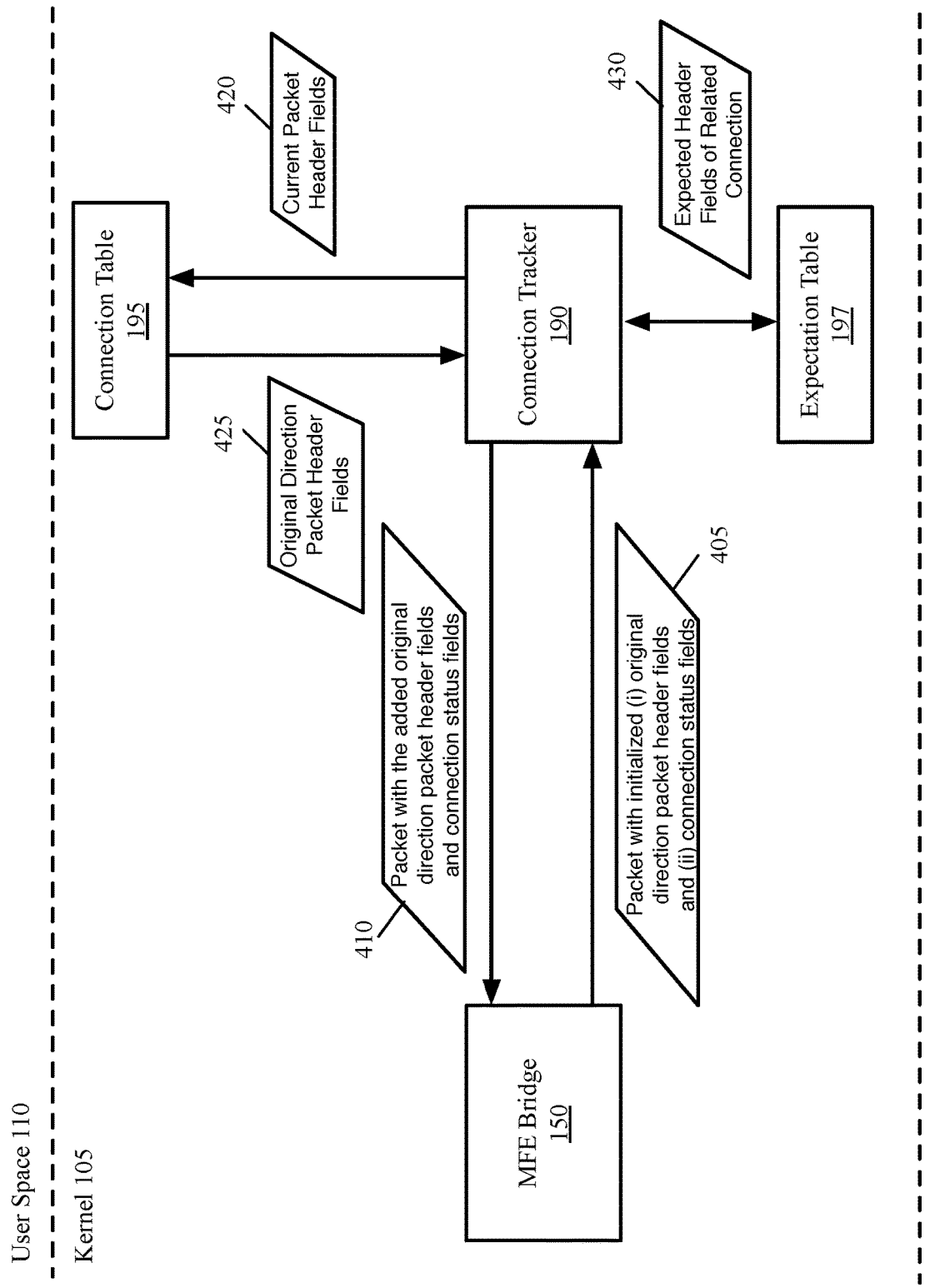
FIG. 4 conceptually illustrates a connection tracker of some embodiments.

B. Receiving Header Fields of the Original Direction Packet from the Connection Tracker FIG. 4 conceptually illustrates a connection tracker of some embodiments. As shown, connection tracker 190 receives a packet 405 from the MFE bridge 150. For instance, the MFE bridge receives a packet from an outside network and determines that one of the flow entries for the packet requires (e.g., as an action) to send the packet to the connection tracker (e.g., in order to determine the connection status and then apply a firewall rule that depends on the stateful connection status). The MFE bridge checks the connection status information to determine this connection status, but as the status has not yet been determined, this status information indicates that the connection status is unknown. Thus, the bridge 150 forwards the packet 405 (or a data structure that represents the packet) to the connection tracker 190 to determine the packet's connection status.

Figure 5:
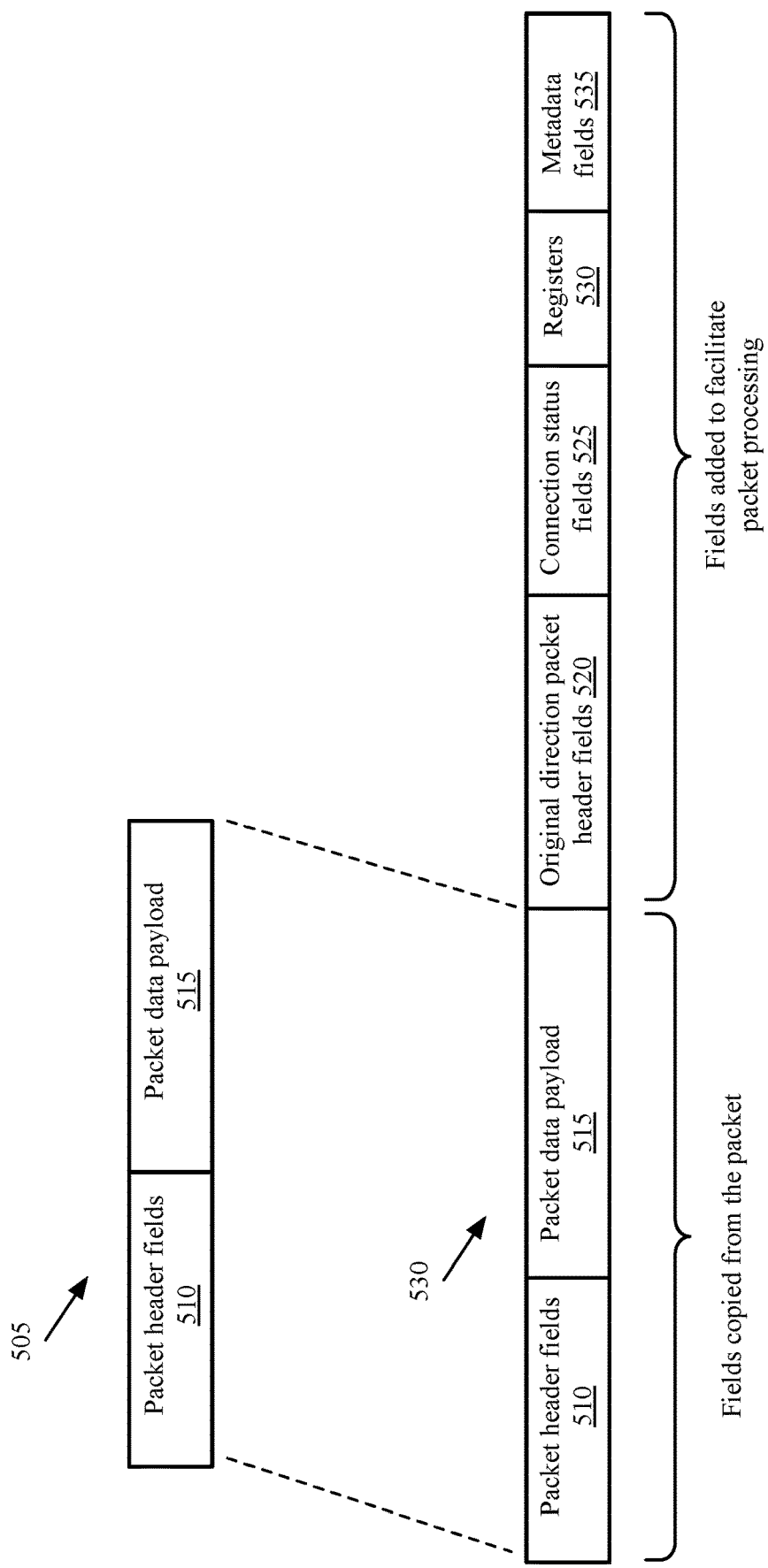
FIG. 5 conceptually illustrates an object created by the MFE for a packet that includes fields received in the packet as well as additional fields added to facilitate packet processing in some embodiments.

As described above, the packet processor 155 defines a data structure for a packet that includes one or more registers that store the header values of the packet. The packet object is then used to represent the packet in the MFE. FIG. 5 conceptually illustrates an object created by the MFE for a packet that includes fields received in the packet as well as additional fields added to facilitate packet processing in some embodiments. As shown, the packet 505 received at MFE includes several packet header fields 510 as well as a data payload 515. The MFE (e.g., the MFE daemon 165) creates an object 530 for the packet that includes the packet's header fields 510 and payload data 515.

In addition, the created object 530 includes several additional temporary fields for (i) the n-tuple of the original direction packet related to the current packet (or the n-tuple of the original direction packet of the master connection, if the current packet connection has an associated master connection), (ii) a set of bits to identify the connection status 525, (iii) a set of register fields (or registers) 530, and (iv) metadata 535. Registers provide the MFE space with temporary storage while a packet is being processed. Packet metadata in some embodiments is used to carry information from one flow table to the next. Metadata fields relate to the origin or processing of a packet, and are not extracted from the packet data itself. For instance, one of the metadata fields is used in some embodiments to identify the MFE ingress port from which the packet is received. In some embodiments, the packet metadata and register fields may be used interchangeably.

The header fields 520 of the original direction packet are initialized (e.g., set to zero) when the packet object is sent to the connection tracker. In addition, for any packet that is received from outside (i.e., not recirculated from the connection tracker to the MFE), the connection status bits are initialized to indicate that the connection status is unknown (e.g., all bits are set to 0). The connection tracker then populates the fields when the connection tracker either finds the current packet's connection or generates a new entry for the packet connection in the connection table.

In some embodiments, the fields 520 necessary for the original direction 5-tuple fields are partially overlaid with other, mutually exclusive packet headers, such as those reserved for (Reverse) Address Resolution Protocol (R)ARP and/or IPv6 Neighbor Discovery (ND). These protocols typically use a broadcast communication pattern and are commonly deemed untraceable by the connection tracking facility.

Since the original direction 5-tuple fields 520 are only needed for tracked connections, most of them can be safely made to take the same space in the flow key as the (R)ARP and/or ND headers would, thus minimizing the growth of the data path flow key 530 and helping optimize memory and related computation costs (e.g., hashing and comparison computations).

This overlaying can be further made safer by requiring that any matches on the new original direction 5-tuple fields be only allowed by rules that match on the connection tracking state bits making sure a valid connection tracking entry exists, as these new flow key fields are only populated for tracked connections, and a (R)ARP or ND packet cannot have a valid connection tracking entry.

Referring back to FIG. 4, once the connection tracker 190 receives the packet, the connection tracker examines a set of fields in the packet header to determine whether the packet is associated with an established connection (or flow). For instance, in some embodiments a set of n fields (an n-tuple) in a packet header uniquely identifies the connection associated with the packet. For instance, the n-tuple may identify a connection (e.g., a transport layer connection such as TCP connection) that is established between the source of the packet and the MFE. Example of such an n-tuple is the 5-tuple in the header of a packet that identifies the source IP address, source port number, destination IP address, destination port number, and the identification of the protocol used by the packet. This 5-tuple in some embodiments uniquely identifies the connection associated with a packet.

For each packet that is sent to the connection tracker 190, the connection tracker checks a set of n-tuples that are stored in the connection table 195 against the header fields of the current packet. Each n-tuple stored in the connection table identifies a connection that is already established between two endpoints (typically, one of which is a VM or other data compute node that connects directly to the MFE).

When the connection tracker receives a packet (or the data structure that represents the packet) from the MFE bridge 150 and does not find the header fields n-tuple of the packet (or the header fields of a related connection, as is described below) in the connection table, the connection tracker 190 adds the packet's n-tuple (as shown by 420) to the connection table 190. The packet in this case is the first packet that establishes a new connection (i.e. the packet is the original direction packet).

Regardless of whether the packet establishes a new connection or not, the connection tracker (i) tags the packet with a connection status (e.g., as belonging to: a new connection, an established connection, a connection related to another existing connection, a reply to an existing connection, etc.), (ii) retrieves (as shown by 425) the headers of the original direction packet of the connection associated with the current packet, (iii) adds the headers of the original direction packet to the current packet object, and (iv) sends the modified packet structure 410 back to the MFE with additional data (i.e., the headers of the original direction packet and one or more bits to identify the connection status).

The connection tracker uses the same set fields (or n-tuple) in each packet is compared with the saved entries in the connection table to determine whether a packet is associated with an existing or related connection. A related connection, for example, might be a control portion of a control/data communication between two endpoints, such that the ports are different but the network addresses the same. The related connection is identified by comparing a set of header fields of the current packet with the expected header fields of related connections (as shown by 430) that are stored in the expectation table 197.

Once the connection tracker determines the connection status, the connection tracker sets a tag in the packet to specify the connection status. For instance, if only four values are possible (e.g., new, established, reply, and related, then two bits (00, 01, 10, 11) could be used. Other embodiments may use more or fewer values to identify different packet statuses. The connection tracker 190 then returns the packet to the MFE, which recirculates the packet back to the input queue while assigning the packet a new recirculation value (which can be used, as described below, to restore metadata and packet headers for the packet).

It should be noted that, while in this example the datapath and connection tracker are shown in the kernel, some embodiments implement the entire flow-based MFE in the user space of the virtualization software (e.g., a DPDK-based implementation). In this case, the connection tracker is also implemented in the user space as well, and similar principles to those described herein apply to both the operation of the connection tracker and the recirculation mechanism.

As shown in FIG. 1, the virtualization software includes device drivers 125 and 130 for the pNICs 113 and 115, respectively. The device drivers 125 and 130 allow an operating system to interact with the hardware of the host 100. The VMs 135-138 are independent virtual machines operating on the host 100, and may run any number of different operating systems (e.g., Linux, Solaris, FreeBSD, or any other type of UNIX based operating system, Windows-based operating systems, etc.). While this figure shows an example in which the MFE operates within the virtualization software of the host and the VMs 135-138 operate on top of that virtualization software, it should be understood that the disclosed embodiments are equally applicable when the MFE is not part of any virtualization software (e.g., in non-virtualized environments). In some such embodiments, no virtualization software is present on the host machine, and thus VMs are not present (instead, packets may simply be forwarded between pNICs).

The user space 110 of the virtualization software includes the MFE daemon 165 and the MFE database daemon 167. The MFE daemon 165 is an application that runs in the background of the user space 110. The MFE daemon 165 of some embodiments receives configuration data from the network controller 180 (which may be a chassis controller operating on the host, or a network controller operating on a separate physical machine to manage several host machines) and the MFE database daemon 167. For instance, from the controller, the MFE daemon 165 of some embodiments receives generated flow entries that specify packet processing operations to apply to packets when the packets match a set of conditions. The MFE daemon 165 stores the received flow entries in the flow tables 175. In some embodiments, the flow tables are organized in stages (e.g., stages of packet processing), with one or more stages for each of several logical forwarding elements. For instance, a logical switch might have an ingress mapping stage, an ingress access control list (ACL) stage, a logical forwarding stage, an egress ACL stage, etc.). For an MFE implementing multiple logical networks, each of the logical networks has several stages of flow tables in some embodiments.

In some embodiments, the MFE daemon 165 communicates with the network controller 180 using the OpenFlow Protocol, while the MFE database daemon 167 communicates with the network controller 180 through a database communication protocol (e.g., OVSDB protocol). The database protocol of some embodiments is a JavaScript Object Notation (JSON) remote procedure call (RPC) based protocol.

The MFE database daemon 167 is also an application that runs in the background of the user space 110 in some embodiments. The MFE database daemon 167 in some embodiments communicates with the network controller 180 in order to configure certain aspects of the MFE (e.g., of the MFE daemon 165 and/or the datapath manager 120) other than the installation of flow entries. For instance, the MFE database daemon 167 receives management information from the network controller 180 for configuring bridges, ingress ports, egress ports, QoS configurations for ports, etc., and stores the information in a set of databases that help define the configuration of the MFE.

It should be understood that the architecture shown in FIG. 1 is an example architecture and that different embodiments can include different sets of components. The naming of the various components is arbitrary and can change from one implementation to another. Also, the architecture shows two different layers (e.g., the kernel layer and the user space layer) performing various operations. In some embodiments, these operations occur at just one layer (e.g., at the user space layer) or are further split into other layers.

C. Policy Enforcement Based on the Header Fields of the Original Direction Packet Some embodiments use the header of the original direction packet for enforcing network policies. For instance, some embodiments replace the n-tuple of a packet header with the n-tuple of the original direction packet for the purpose of rule matching that are written based on the header fields of the original direction packet rather than the header fields of a packet that is currently being processed.

Figure 6:
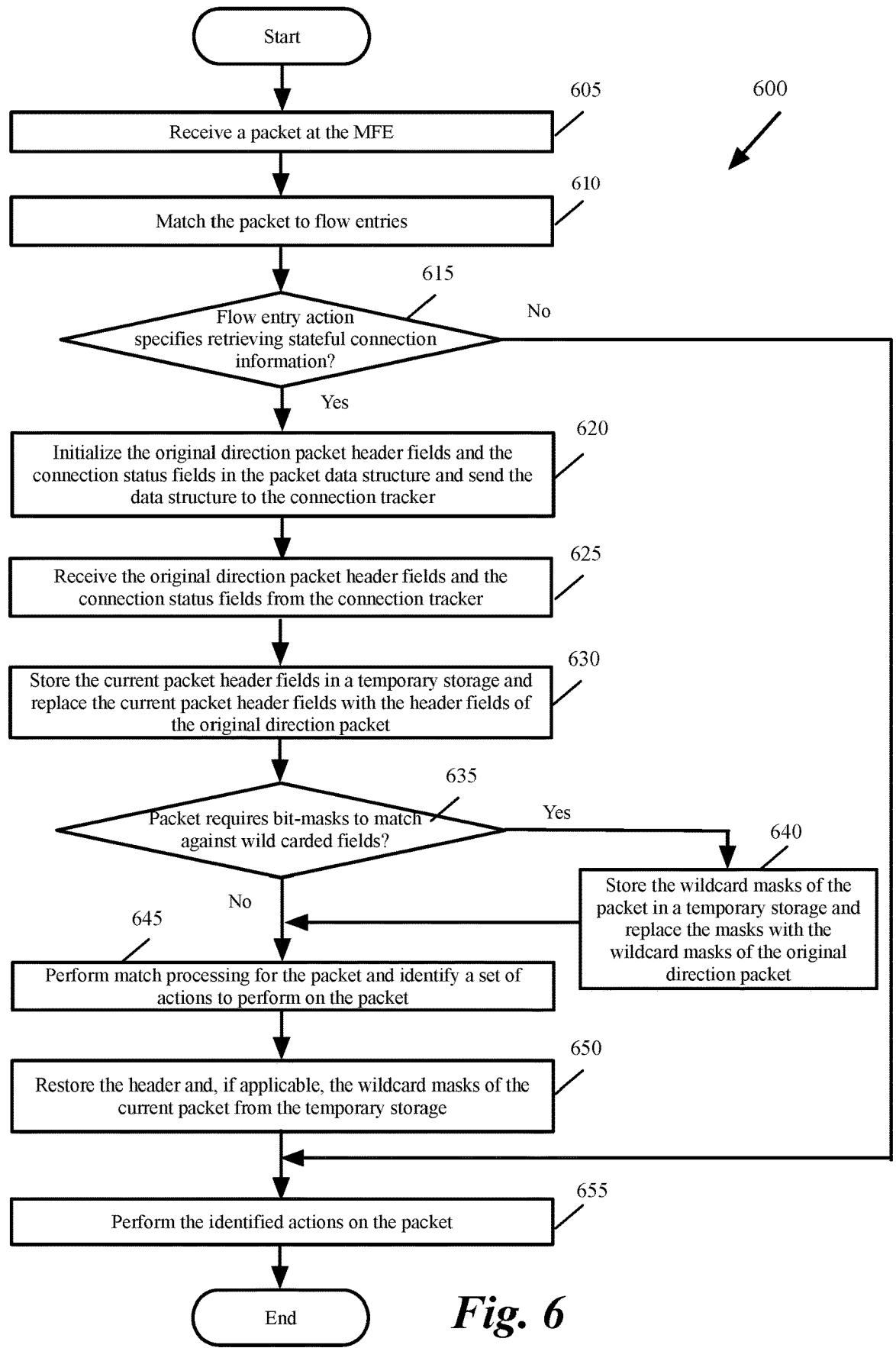
FIG. 6 conceptually illustrates a process of some embodiments performed by an MFE that uses information retrieved from a connection tracker to perform policy enforcement in some embodiments.

FIG. 6 conceptually illustrates a process 600 of some embodiments performed by an MFE (e.g., the MFE of FIG. 1) that uses information retrieved from a connection tracker to perform policy enforcement in some embodiments. The process is performed in some embodiments by the bridge 150 of the datapath manager 120, or by the user space MFE daemon 165. It should be understood that this process 600 is conceptual, and is actually only representative of a portion of the operations performed by the MFE when processing a packet. Furthermore, it should be understood that the MFE of some embodiments does not actually make a yes/no determination as to whether each action requires it to send a packet to the connection tracker, but rather simply sends the packet to the connection tracker when an action specifies such.

As shown, the process receives (at 605) a packet at the MFE. This could be a packet sent by a local VM or other data compute node, or a packet received from an external source (e.g., directed to a local VM or other data compute node). The process then matches (at 610) the packet to the flow entries in the flow tables of the MFE. In some embodiments, this may involve kernel matches over cached flow entries (e.g., over an exact match cache, an aggregate traffic cache, etc.), or one or more stages of user space flow entry tables. In the latter case, then actions (e.g., to modify the packet header and metadata information) may be performed at each stage, while continuing to perform the packet processing. Once a dispositive action is determined for the packet, the packet and a new flow entry to be applied and cached are sent down to the kernel, where the operations can be performed.

The process then determines (at 615) whether the matched flow entry action (e.g., the single matched entry in the kernel, or one of the entries matched in user space) specifies retrieving stateful connection information by sending the packet to the connection tracker. For example, a flow entry might specify a function such as "ct( )" to send the packet to the connection tracker so that stateful connection information can be retrieved, which can then be used as a match condition in subsequent stages to implement a stateful firewall (or other stateful operations that use the connection state) in the stateless MFE. Some firewall rules require knowledge of connection state. For instance, a firewall rule may allow a virtual machine to initiate connections to the Internet (or an external network) and those connections are allowed to send response packets in the network. However, connections that are initiated from the Internet are not allowed.

When none of the matched entries specify to retrieve stateful connection information for the packet, the process proceeds to 655, which is described below. Otherwise, the process initializes (at 620) the original direction packet header fields and the connection status fields in the packet data structure and sends the data structure to the connection tracker. For instance, the process initializes the header fields 520 of the original direction packet and the connection status fields 525 shown in FIG. 5.

The connection tracker identifies the connection status, retrieves the headers of the original direction packet, tags the packet with the relevant status information, and returns the packet to the MFE (e.g., for the MFE to recirculate the packet back to the datapath). As shown, the process receives (at 625) the original direction packet header fields and the connection status fields from the connection tracker (e.g., as a recirculated packet). The process the stateful connection status and the headers of the original direction packet in subsequent packet processing on the recirculated packet.

The process then stores (at 630) the current packet header fields in a temporary storage (e.g., in a register 530 shown in FIG. 5) and replaces the current packet header fields (i.e. the packet's n-tuple) with the header fields (i.e., the n-tuple) of the original direction packet.

Temporarily replacing the header fields of a packet with the header fields of the original direction packet for the purpose of rule matching optimizes the resources and simplifies the firewall rules. Some embodiments use a function such as "resubmit with original direction headers" to submit the header fields of the original direction packet to firewall rule tables. With such a replacement, the firewall rules can be written with reference to the traditional 5-tuple headers, and the same table may be used for performing firewall lookup using the actual packet 5-tuple headers from the packet and/or the original direction 5-tuple packet headers, depending on whether the packet is submitted to the firewall rules table normally without header replacement, or if the temporary header replacement is performed.

The process then determines (at 635) whether the packet requires bit-masks to match ageist wild carded fields. When generating wildcarded data path flows, as opposed to exact-matched data path flows, it is necessary to keep track of the header fields deemed necessary for the pipeline processing decision making as the packet is being matched and manipulated. In some embodiments, this wildcard tracking involves a set of bit-masks providing one mask bit for each packet header bit. Generally, the masks start zeroed out, to indicate that no packet header bit was relevant for the packet processing decision-making and/or packet manipulation.

Then, as a packet is subjected to decision-making, e.g., matching against a table of packet processing rules, the bits in the mask corresponding to the relevant packet header bits are turned on. At the end of the pipeline processing, when the packet is ready for output (or drop) the set of 1-bits in the masks determine which packet header bits must match the data path, and the remaining bits can be wildcarded. In this case the "resubmit with original direction headers" would not just replace the actual packet headers with the original direction headers for the duration of the packet matching process, but would do the same for the corresponding packet header masks.

If the packet does not require bit-masks to match against wild-carded fields, the process proceeds to 645, which is described below. Otherwise, the process stores the wildcard masks of the current packet in a temporary storage and replaces (at 640) the wildcard masks of the current packet with the wild card mask of the original direction packet. The process then performs (at 645) match processing for the packet and identifies a set of actions to perform on the packet.

The process uses the connection status and the headers of the original direction packet for the match processing. This connection status enables the MFE to apply stateful firewall rules (e.g., to drop packets for non-established connections that do not meet certain criteria) or to apply other stateful processing that uses the connection status as its state. For instance, this connection status may be used as a match condition for subsequent flow entries that specify whether to drop or allow the packet. It should be understood that other embodiments may use other stateful modules in a similar manner, and use the stateful data as match conditions on other types of stateful flow entries.

The process then restores (at 650) the header and (if applicable) the wildcard masks of the current packet from the temporary storage. The process then performs the identified actions such as outputting the packet to a particular port, dropping the packet, recirculating the packet, etc.).

In some embodiments, the "resubmit with original direction headers" construct is implemented both in the slow path packet processing pipeline (i.e., when the packets are processed in the user space) as well as in the datapath packet processing pipeline in the kernel. In other embodiments, the "resubmit with original direction headers" construct is only implemented in the slow path packet processing pipeline. In these embodiments, where the datapath packet processing pipeline in the kernel is not aware of the "resubmit with original direction headers," the data path processing becomes simpler. These embodiments also avoid additional recalculations of the packet in the data path, while still offering the benefits stated above in the slow path packet processing pipeline, which is the one providing the programming interface to the control plane.

Figure 7:
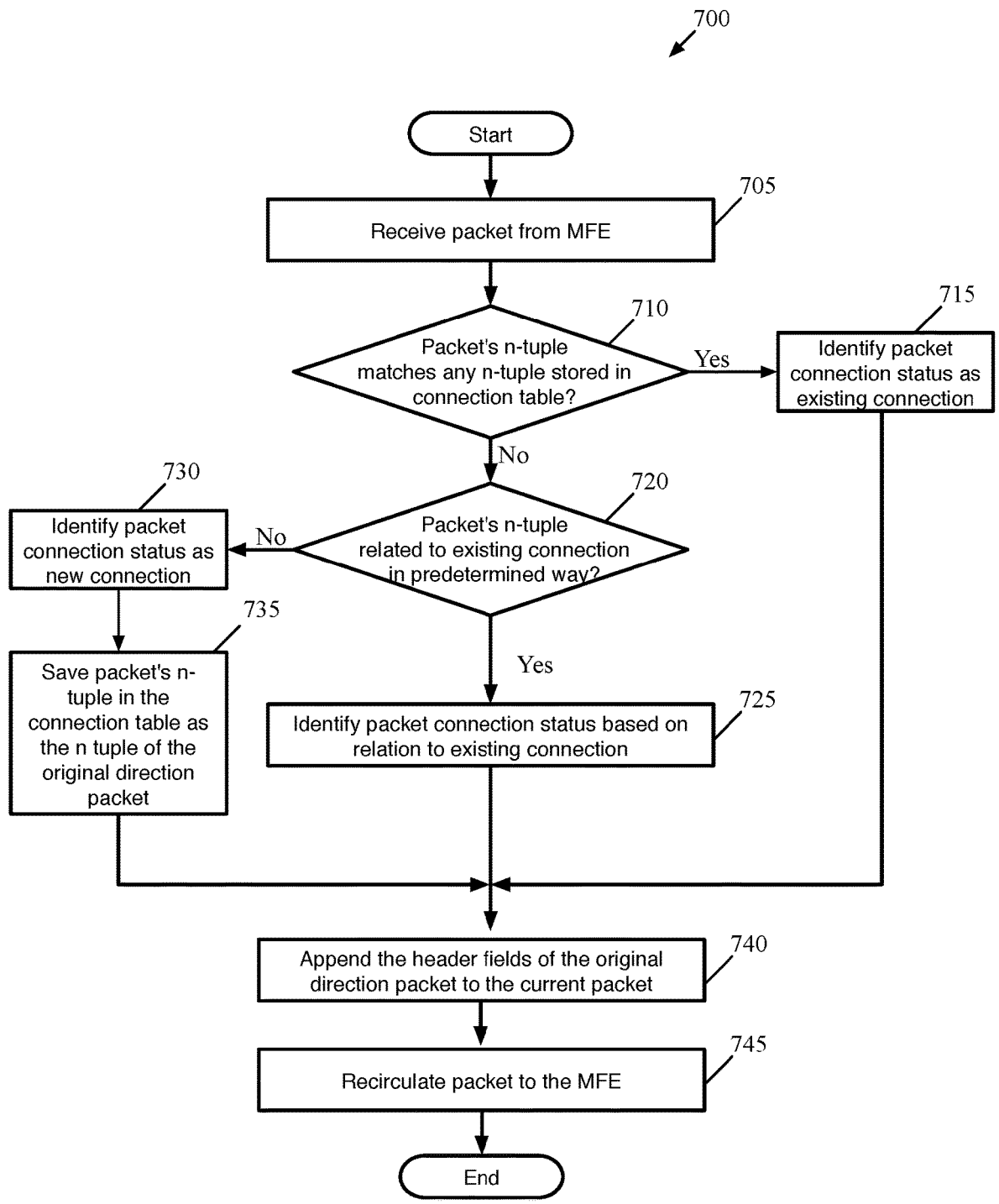
FIG. 7 conceptually illustrates a process of some embodiments for determining the connection status of a packet and retrieving the header fields of the original direction packet associated with a packet's connection.

FIG. 7 conceptually illustrates a process 700 of some embodiments for determining the connection status of a packet and retrieving the header fields of the original direction packet associated with a packet's connection. Process 700 is performed by the connection tracker (e.g., the connection tracker 190) in some embodiments.

As shown, the process receives (at 705) a packet from the MFE. As described above by reference to FIG. 1, both the MFE component (e.g., bridge 150) and the connection tracker (190) operate in the kernel of virtualization software of a host machine in some embodiments (though in other embodiments, the MFE and connection tracker may operate in the user space of the virtualization software).

Upon receipt of the packet, the process determines (at 710) whether the packet's n-tuple that identifies the packet connection (or packet flow) matches any established connection's n-tuple that is stored in its connection table. The connection tracker may perform a hash lookup for the n-table in some embodiments by hashing the n-tuple and performing a lookup in a hash table that points to a specific connection in the connection table, then verifying that the referenced n-tuple does in fact match that of the packet. Other embodiments may use other table search techniques to identify whether a match exists in the connection table.

When the packet's n-tuple matches an n-tuple in the connection table, the process identifies (at 715) the packet as belonging to an established connection. For instance, the process sets or resets one or more bits associated with the packet that identify the connection status of the packet, in order to specify the packet's connection status as belonging to an established connection. This may be a simple 2-bit or 3-bit value in some embodiments, or may be a string or numeric value in other embodiments.

When the packet's n-tuple does not directly match an n-tuple in the connection table, the process 700 of some embodiments determines (at 720) whether the packet's n-tuple is related to an existing connection. For example, some embodiments identify a packet that is a reply to an existing connection (e.g., a reverse-direction packet). In this case, for the standard connection 5-tuple, the source address and source port of the packet would match the destination address and destination port of the 5-tuple, while the destination address and destination port of the packet match the source address and source port of the five-tuple). To perform such a check, some embodiments swap the source and destination fields of the packet and perform a hash lookup similar to that described above for the existing connection lookup.

As another example, some embodiments determine whether a 5-tuple shares the same addresses as an existing connection but with different source and/or destination ports. This could be evidence of a related connection, such as a control signal connection that corresponds to an existing data connection (or vice versa). In either case (or in the case any other connection relatedness test is passed), the process identifies (at 725) the packet as belonging to a particular type of connection (e.g., reply, related, etc.). For instance, the process sets or resets one or more bits associated with the packet that identify the connection status of the packet, in order to specify the packet's connection status as belonging to an established connection. This may be a simple 2-bit or 3-bit value in some embodiments, or may be a string or numeric value in other embodiments.

If the packet does not match or relate to an existing connection in any way, the process identifies (at 730) the packet's connection status as belonging to a new connection. As for the other statuses, the process may set one or more bits associated with the packet, set a string or numeric value, etc. The process also saves (at 735) the packet's n-tuple in the connection table. In some embodiments, the process also saves the n-tuple for packets that are related or replies to existing connections, so that subsequent packets for those connections will be treated as belonging to existing connections.

The process then appends (at 740) the header fields of the original direction packet to the current packet. The process then recirculates (at 740) the packet to the MFE. the process then ends. The in-kernel recirculation of the packet of some embodiments places the packet back in the MFE's input queue, this time with the connection status appropriately set or reset to indicate the packet's connection status. In addition, in some embodiments, the MFE assigns a new recirculation identifier to the packet that is used to restore metadata and packet headers for the packet. Once a packet has its stateful connection status appended as a header or metadata field, flow entries that match on this stateful information may be applied to the packet (e.g., stateful firewall rules).

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
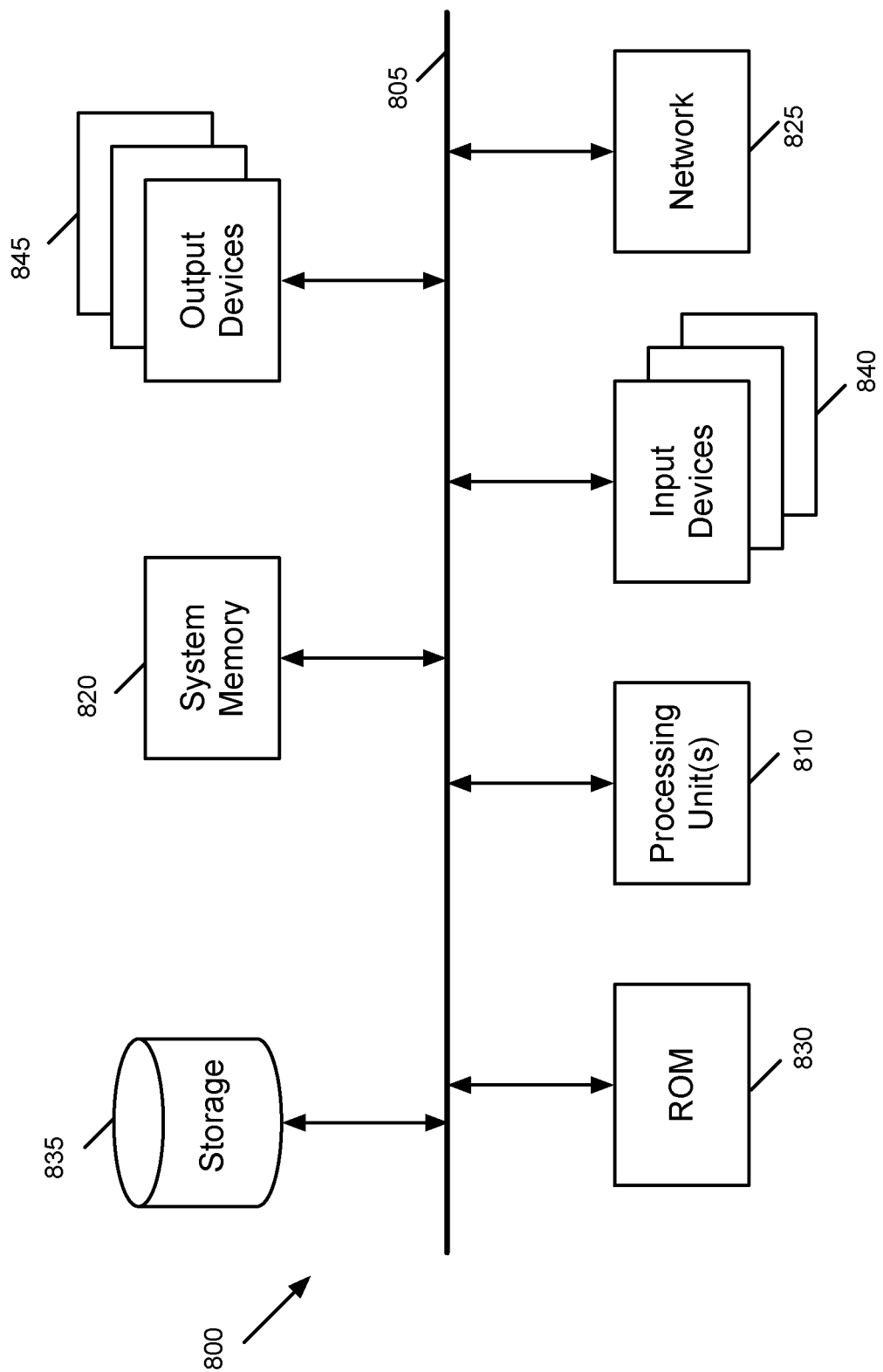
FIG. 8 conceptually illustrates an electronic system with which some embodiments of the invention are implemented.

FIG. 8 conceptually illustrates an electronic system 800 with which some embodiments of the invention are implemented. The electronic system 800 can be used to execute any of the control, virtualization, or operating system applications described above. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 820, a read-only memory (ROM) 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 820, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 820 is a read-and-write memory device. However, unlike storage device 835, the system memory is a volatile read-and-write memory, such as random access memory. The system memory stores some of the instructions and data that the processor needs at runtime. In some embodiments, the invention's processes are stored in the system memory 820, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 825 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 6-7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method for performing stateful processing of a packet at a flow-based managed forwarding element (MFE) on a host computer, the method comprising:
   sending a first packet from the MFE to a connection tracker that stores headers of a set of connection-establishing packets for allowed connections, a header of the first packet comprising a first set of header field values used to identify a first data flow to which the first packet belongs;

from the connection tracker, receiving the first packet with header information of a connection-establishing packet appended to the first packet, the header information comprising (i) a second set of header field values used to identify a second data flow to which the connection-establishing packet belongs and that are different than the first set of header field values and (ii) stateful connection status information indicating a relation of the first data flow to the second data flow; and temporarily replacing the first set of header field values in the header of the first packet with the second set of header field values to perform a matching operation on the first packet using the second set of packet header field values and the stateful connection status information; and transmitting the first packet with the first set of header field values.

2. The method of claim 1, wherein the matching operation identifies an action to perform on the packet, the method further comprising:

after performing the matching operation, restoring in the header of the first packet, the first set of header field values in place of the second set of header field values; and performing the identified action on the packet.

3. The method of claim 2, wherein the first packet is sent to the connection tracker based on a first flow entry stored in the MFE and the action is performed on the first packet based on a second flow entry stored in the MFE.

4. The method of claim 3, wherein the second flow entry matches over the stateful status connection information.

5. The method of claim 1, wherein the matching operation requires performing a set of wildcarded match operations, the method further comprising replacing a set of wildcard masks associated with the first packet with a set of wildcard masks associated with the original direction packet.

6. The method of claim 1, wherein performing the matching operation on the packet using the second set of header field values comprises determining whether a set of firewall rules that are written based on the header field values of the connection-establishing packet are applicable to the first packet.

7. The method of claim 1, wherein the MFE is connected to a set of network nodes executing on the host computer, wherein the connection-establishing packet associated with the first packet is communicated between two network nodes, at least one of which executes on the host computer, in a first direction, wherein the first packet is a reply packet communicated in a second direction that is opposite to the first direction.

8. The method of claim 1, wherein the MFE is connected to a set of network nodes executing on the host computer, wherein the connection-establishing packet associated with the first packet establishes a control connection between two network nodes at least one of which executes on the host computer, wherein the first packet is a data packet communicated between the two network nodes.

9. The method of claim 1, wherein the stateful connection status information indicates whether the packet belongs to a new connection or an existing connection.

10. The method of claim 1, wherein the stateful connection status information indicates whether the packet belongs to a connection related to an existing connection.

11. A non-transitory machine readable medium storing a flow-based managed forwarding element (MFE) which when executed by at least one processing unit performs stateful processing of a packet, the program comprising sets of instructions for:

sending a first packet from the MFE to a connection tracker that stores headers of a set of connection-establishing packets for allowed connections, a header of the first packet comprising a first set of header field values used to identify a first data flow to which the first packet belongs;

from the connection tracker, receiving the first packet with header information of a connection-establishing packet appended to the first packet, the header information comprising (i) a second set of header field values used to identify a second data flow to which the connection-establishing packet belongs and that are different than the first set of header field values and (ii) stateful connection status information indicating a relation of the first data flow to the second data flow; and temporarily replacing the first set of header field values in the header of the first packet with the second set of header field values to perform a matching operation on the first packet using the second set of packet header field values and the stateful connection status information; and transmitting the first packet with the first set of header field values.

12. The non-transitory machine readable medium of claim 11, wherein the matching operation identifies an action to perform on the packet, the program further comprising sets of instructions for:

after performing the matching operation, restoring in the header of the first packet, the first set of header field values in place of the second set of header field values; and performing the identified action on the packet.

13. The non-transitory machine readable medium of claim 12, wherein the first packet is sent to the connection tracker based on a first flow entry stored in the MFE and the action is performed on the first packet based on a second flow entry stored in the MFE.

14. The non-transitory machine readable medium of claim 13, wherein the second flow entry matches over the stateful status connection information.

15. The non-transitory machine readable medium of claim 11, wherein the matching operation requires performing a set of wildcarded match operations, the program further comprising a set of instructions for replacing a set of wildcard masks associated with the first packet with a set of wildcard masks associated with the original direction packet.

16. The non-transitory machine readable medium of claim 11, wherein the set of instructions for performing the matching operation on the packet using the second set of header field values comprises a set of instructions for determining whether a set of firewall rules that are written based on the header field values of the connection-establishing packet are applicable to the first packet.

17. The non-transitory machine readable medium of claim 11, wherein the MFE is connected to a set of network nodes executing on the host computer, wherein the connection-establishing packet associated with the first packet is communicated between two network nodes, at least one of which executes on the host computer, in a first direction, wherein the first packet is a reply packet communicated in a second direction that is opposite to the first direction.

18. The non-transitory machine readable medium of claim 11, wherein the MFE is connected to a set of network nodes executing on the host computer, wherein the connection-establishing packet associated with the first packet establishes a control connection between two network nodes at least one of which executes on the host computer, wherein the first packet is a data packet communicated between the two network nodes.

19. The non-transitory machine readable medium of claim 11, wherein the stateful connection status information indicates whether the packet belongs to a new connection or an existing connection.

20. The non-transitory machine readable medium of claim 11, wherein the stateful connection status information indicates whether the packet belongs to a connection related to an existing connection.

* * * * *